United States Patent
Kuhn et al.

(10) Patent No.: US 9,237,499 B2
(45) Date of Patent: Jan. 12, 2016

(54) METHOD DEVICE AND SYSTEM FOR CONTROLLING HANDOFF

(75) Inventors: Matthias Kuhn, Braunschweig (DE); Mattias Lampe, Beijing (CN); Hans-Joachim Vornholz, Cremlingen (DE); Jie Zhang, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 190 days.

(21) Appl. No.: 13/995,000

(22) PCT Filed: Dec. 17, 2010

(86) PCT No.: PCT/CN2010/079931
§ 371 (c)(1),
(2), (4) Date: Jul. 29, 2013

(87) PCT Pub. No.: WO2012/079242
PCT Pub. Date: Jun. 21, 2012

(65) Prior Publication Data
US 2013/0301617 A1 Nov. 14, 2013

(51) Int. Cl.
*H04W 36/08* (2009.01)
*H04W 36/00* (2009.01)

(52) U.S. Cl.
CPC .......... *H04W 36/08* (2013.01); *H04W 36/0033* (2013.01); *H04W 36/0083* (2013.01)

(58) Field of Classification Search
None
See application file for complete search history.

(56) References Cited

U.S. PATENT DOCUMENTS

| | | | |
|---|---|---|---|
| 7,299,019 B1* | 11/2007 | Austin et al. | 455/161.3 |
| 2005/0030924 A1* | 2/2005 | Yano et al. | 370/332 |
| 2005/0282546 A1* | 12/2005 | Chang et al. | 455/436 |
| 2006/0187873 A1* | 8/2006 | Friday et al. | 370/328 |
| 2007/0019597 A1* | 1/2007 | Yun et al. | 370/338 |
| 2007/0249291 A1* | 10/2007 | Nanda et al. | 455/73 |
| 2008/0280621 A1* | 11/2008 | Soomro et al. | 455/450 |
| 2008/0318576 A1* | 12/2008 | So et al. | 455/436 |
| 2009/0088152 A1* | 4/2009 | Orlassino | 455/432.1 |
| 2009/0122730 A1* | 5/2009 | Yang et al. | 370/280 |
| 2010/0130212 A1* | 5/2010 | So et al. | 455/444 |

FOREIGN PATENT DOCUMENTS

| | | |
|---|---|---|
| CN | 1438789 A | 8/2003 |
| CN | 101094128 A | 12/2007 |
| CN | 101521924 A | 9/2009 |

* cited by examiner

*Primary Examiner* — Hassan Kizou
*Assistant Examiner* — Hashim Bhatti
(74) *Attorney, Agent, or Firm* — Laurence Greenberg; Werner Stemer; Ralph Locher

(57) ABSTRACT

A handoff control method includes the following: Handoff status information of a first mobile host (MH) is collected. The handoff status information includes at least one parameter that is used for representing a status that happened during the first handoff from a source access point (AP) to a target AP. A handoff policy is generated based on the handoff status information, and used for optimizing a handoff process of an MH associated with the source AP. The handoff process occurs after the first MH is handed off from the source AP. The handoff policy is sent to the MH associated with the source AP, so the MH associated with the source AP can perform the handoff according to the handoff policy. A handoff control device and a system represent technical solutions that optimize the handoff process, reduce a total time delay of handoff, and increase a likelihood of successful handoff.

16 Claims, 7 Drawing Sheets

METHOD DEVICE AND SYSTEM FOR CONTROLLING HANDOFF

FIELD OF INVENTION

The present invention relates to the field of mobile communication technology, and more particularly, to a handoff control technology.

BACKGROUND OF THE INVENTION

A wireless local area network (WLAN) has been more and more widely used in the last few years. Originally, WLAN was designed to eliminate tangled cables among network devices in an indoor environment, and handoff support was not perceived as a critical issue. However, with the fast development of the WLAN technology, in practical applications, the WLAN is expected not only to provide a high data rate, but also to support real-time services, such as Voice over Internet Protocol (VoIP) and multimedia applications. As the real-time services have high requirements for time delay, the WLAN technology needs to support fast handoff between different access points (APs). However, due to insufficient handoff support in a WLAN network based on the IEEE802.11 Protocol, a significant disruption can be experienced while a mobile host (MH) performs handoff. Consequently, support of fast smooth handoff in a WLAN network has become a vital issue to achieve seamless mobile services.

In a WLAN network, a whole handoff procedure can usually be divided into three phases: scanning, authentication, and reassociation. In the scanning phase, the IEEE802.11 standard provides two types of scanning schemes: passive and active. In the passive scanning, MHs monitor each channel one by one for beacon frames sent by APs. In active scanning, MHs transmit probe requests on each channel, and the APs that receive the probe request feed back probe response frames. After all channels are scanned, the MH selects one AP for association according to the feedback information from all available APs. It is obvious that in both active and passive scanning schemes, the scanning phase in the handoff procedure leads to great delay.

In order to solve above problem and realize fast handoff in the WLAN network, many solutions are proposed.

For example, in order to reduce delays that occurs in the scanning procedure, a non-overlapping neighbor graph technology is proposed. In this technology, a non-overlapping neighbor graph for each channel of each AP needs to be constructed. If the MH cannot communicate with two APs with an acceptable communication quality at the same time, the two APs are non-overlapped. When the MH receives a probe response of an AP, it can be judged that no probe response from other APs in the non-overlapping neighbor graph of the AP is to be received, so the probe responses of the APs need not to be waited for. Therefore the number of probe responses to be waited for is reduced, so that time required for scanning is saved. A critical point of the technology is to acquire a non-overlapping neighbor graph, but currently acquisition of the non-overlapping neighbor graph is very difficult, so implementation of the technology is quite complicated. Further, as the technology needs to modify existing handoff protocols, the implementation cost is too high for current networks.

In order to reduce delays during the scanning procedure, a SyncScan technology is further proposed. In the technology, the MH is required to be handed off to each channel regularly and monitor nearby APs. Therefore, when handoff is required, the AP to which the MH can be handed off can be acquired without scanning. The SyncScan technology requires the MH to perform periodic scanning, so the processing of the MH is increased, and other work of the MH is influenced.

Above handoff technologies for WLAN network need to change handoff protocols, so the implementation is quite complicated, the cost is too high, and practical implementation is very difficult to be performed to realize fast handoff of the WLAN network.

SUMMARY OF THE INVENTION

In view of the defects in the prior art, in the embodiments, a method, a device and a system for controlling handoff are provided in order to realize fast handoff without changing existing handoff protocols.

Embodiments of the present invention provide the following technical solutions to solve the above technical problems.

In an embodiment, a method for controlling handoff is provided, which includes the following steps:

Handoff status information of a first MH is collected, wherein the handoff status information includes at least one parameter, the parameter is used for representing at least one status happened during the first MH performs handoff from a source AP to a target AP, and the first MH includes at least one MH;

A handoff policy is generated according to the handoff status information, wherein the handoff policy is used for optimizing a handoff process of an MH associated with the source AP, and the handoff process occurs after the first MH is handed off from the source AP; and The handoff policy is sent to an MH associated with the source AP in order to make the MH associated with the source AP perform handoff according to the handoff policy.

In an embodiment, another method for controlling handoff is provided, which includes the following steps:

An MH receives a handoff policy sent by an AP, wherein the AP is associated with the MH, the handoff policy includes at least one of: a recommended AP list, a bad AP list, a weight of the AP, a handoff trigger condition, and a handoff prompt. The MH performs handoff according to the handoff policy.

In an embodiment, a handoff control device is provided, which includes a collection module, a policy module, and a sending module.

The collection module is adapted to collect handoff status information of a first MH, wherein the handoff status information includes at least one parameter, the parameter is used for representing at least one status happened during the first MH performs handoff from a source AP to a target AP, and the first MH includes at least one MH.

The policy module is adapted to generate a handoff policy according to the handoff status information collected by the collection module, wherein the handoff policy is used for optimizing a handoff process of an MH associated with the source AP, and the handoff process occurs after the first MH is handed off from the source AP.

The sending module is adapted to send the handoff policy to the MH associated with the source AP in order to make the MH associated with the source AP perform handoff according to the handoff policy.

In an embodiment, an MH is provided, which includes a receiving module and a handoff module.

The receiving module is adapted to receive a handoff policy sent by an AP, wherein the MH is associated with the AP, and the handoff policy includes at least one of: a recommended AP list, a bad AP list, a weight of the AP, a handoff trigger condition, and a handoff prompt.

The handoff module is adapted to perform handoff according to the handoff policy received by the receiving module.

In an embodiment, a handoff control system is provided, which includes a source AP and a central server. The central server includes the abovementioned devices.

In an embodiment, another handoff control system is provided, which includes a source AP and a target AP. The source AP includes the abovementioned devices.

In technical solutions provided in the embodiments of the present invention, the handoff policy may be acquired through the handoff status information acquired in the handoff that already occurs, so the MH can perform handoff according to the handoff policy. According to different practical demands, different handoff information may be collected to generate different handoff policies, so as to optimize the handoff process, to reduce a total time delay of the handoff, and to increase possibility of successful handoff. Further, through the technical solutions provided in the embodiments of the present invention, the handoff protocols need not to be modified, the existing network is slightly changed, and the implementation cost is low.

BRIEF DESCRIPTION OF THE DRAWINGS

Other characteristics, features, and advantages of the embodiments of the present invention become more apparent through the detailed description with reference to the accompanying drawings.

DETAILED DESCRIPTION OF THE INVENTION

The technical solution provided in each embodiment of the present invention is applicable to a mobile communication scenario, and more particularly, in a WLAN network. Preferentially, the embodiment of the present invention is applied in a scenario that a path for moving is predictable, such as a subway, a railway, and a highway.

Figure 1:
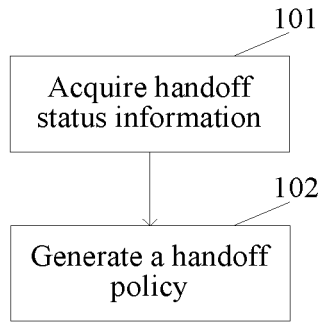
FIG. 1 is a schematic flow chart of a handoff control method according to an embodiment of the present invention.

FIG. 1 is a schematic flow chart of a handoff control method according to an embodiment of the present invention. The handoff control method provided in this embodiment is described in detail with reference to FIG. 1. The method includes the following steps.

In Step 101, handoff status information of a first MH in a handoff procedure is acquired.

In this embodiment, the first MH may include at least one MH, that is, handoff status information of one or more MHs may be acquired. Acquiring handoff status information of more MHs may be better for acquiring a better handoff policy through statistics.

In this embodiment, for example, Step 101 may be performed separately or associatively by at least one of the following equipment: an MH, a source AP, a target AP, and a central server.

In this embodiment, for example, a central server may be used. The central server may communicate with all APs, and may further communicate with the MH. Alternatively, the central server may not be needed, and all APs communicate with each other through the Inter AP Protocol (IAPP).

In this embodiment, the handoff status information includes at least one parameter. The parameter is used for representing at least one status happened during the first MH performs handoff from the source AP to the target AP. For example, the handoff status information may include at least one of: a received signal strength indicator (RSSI) of the source AP when the MH is handed off, an RSSI of the target AP when the MH is handed off, a total handoff time delay when the MH performs hand off from the source AP to the target AP, an association time between the MH and the source AP, and a load situation of the target AP. The handoff status information may further include relevant information of other potential target APs. In this embodiment, the potential target AP includes each AP capable of serving as a target AP for the MH associated with the source AP. The RSSIs are specifically RSSIs when the handoff starts.

In this embodiment, for example, the MH may collect the handoff status information, and send the handoff status information to the target AP. The target AP sends the received handoff status information to the source AP. Alternatively, the target AP sends the received status information to the central server.

In Step 102, a handoff policy is generated according to the acquired handoff status information.

In this embodiment, Step 102 may be performed separately or associatively by at least one of the following equipment: an MH, a source AP, a target AP, and a central server.

In this embodiment, the handoff policy is used for optimizing a handoff process of the MH associated with the source AP. The handoff policy may include, for example, at least one of: weights of potential target APs, maintenance of a recommended AP list, maintenance of a bad AP list, adjustment of a handoff trigger condition, and setting of a handoff prompt. The examples of the handoff policy are only for illustration of the handoff policy, which does not limit the scope of the present invention.

According to the method provided in this embodiment, in practical implementation, different handoff policies may be adopted according to specific demands. For example, the provided services have low requirement for the handoff time delay but have high requirement for service continuity, at this time, the handoff policy may be, for example, to increase a handoff trigger condition, or to set a handoff prompt. Further, for example, the provided services have high requirement for a time delay of handoff, so the handoff policy may be, for example, to maintain a recommended AP list, and APs in the recommended AP list are APs with short total handoff time delays after statistics. Further, for example, when the ping-pong effect is severe or a user quantity is large, the handoff policy may be, for example, to maintain a bad AP list. The APs in the bad AP list are APs that a ping-pong effect might occur or APs of which loads are too high after statistics.

In Step 103, the handoff policy is sent to am MH associated with the source AP.

In this embodiment, the generated handoff policy may be provided for an MH associated with the source AP, so the MH can be handed off according to the handoff policy, such as, selection the target AP or change the handoff trigger condition.

The handoff control method provided in this embodiment may take statistics of historic handoff starting from the source AP. In a situation that the path of an MH is predictable, a historically preferred target AP is likely to become a preferred target AP in the current handoff. Thus, the handoff policy generated according to the handoff status information facilitates to optimize the handoff process of an MH associated with the source AP.

By providing the handoff policy to an MH, the handoff control method provided in this embodiment may enable the MH to determine the target AP according to the handoff policy, so as to save the time for the phases such as MH scanning and authentication, thus realizing fast handoff of the MH. Furthermore, by realizing fast handoff of the MH, it may become more possible to provide high quality real-time services for the MH. It can be seen that through recording or statistics of the handoff status information, different handoff policies may be adopted according to different implementation demands, thereby satisfying different fast handoff demands. The handoff control method provided in this embodiment is described in detail below through specific examples.

Figure 2:
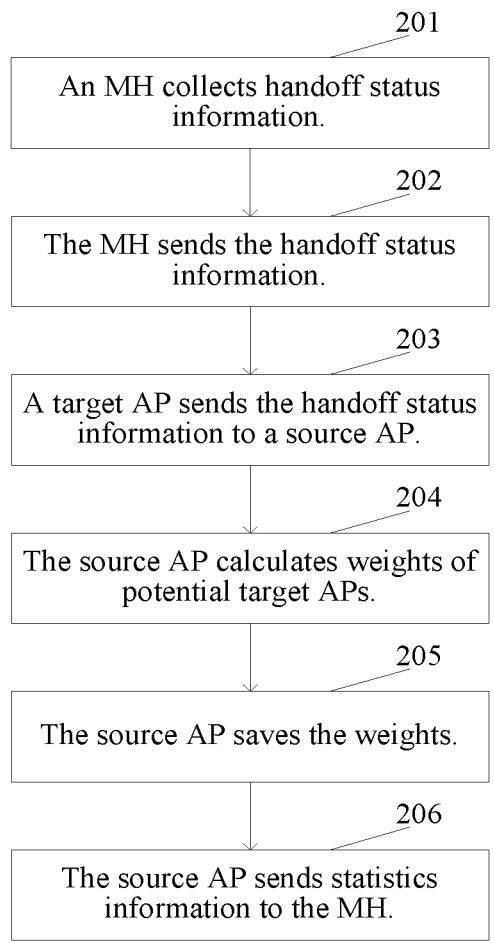
FIG. 2 is a schematic flow chart of another handoff control method according to an embodiment of the present invention.

FIG. 2 is a schematic flow chart of another handoff control method according to an embodiment of the present invention. The method is described in detail below with reference to FIG. 2. The method includes the following steps.

In Step 201, an MH collects handoff status information.

In this embodiment, the MH collects handoff status information in the handoff procedure. In this embodiment, the handoff procedure is not limited, which may be, for example, a handoff procedure in the prior art, or may also be handoff procedure containing the method according to an embodiment of the present invention.

The handoff status information, for example, includes: an RSSI of a source AP, an RSSI of a target AP, and a total handoff time delay.

In Step 202, the MH sends the collected handoff status information to the target AP.

In Step 203, the target AP sends the handoff status information to the source AP.

In this embodiment, the target AP may, for example, send the handoff status information to the source AP through IAPP. In addition to the handoff status information sent by the MH, the handoff status information sent by the target AP further includes information such as the load situation of the target AP.

In Step 204, after receiving the handoff status information sent by the target AP, the source AP processes the handoff status information, and acquires a weight of each potential target AP.

In this embodiment, specifically, the source AP may calculate a weight of each potential target AP according to the handoff status information. In this embodiment, the method of calculating the weight is not limited, for example, the weight may be proportional to the RSSI of the target AP, and the weight may be further inversely proportional to the total handoff time delay. For ease of illustration, in this embodiment, Formula 1 is taken as an example, so as to calculate the weight of each potential target AP.

$$weight_i(t) = \begin{cases} \alpha \cdot weight_i(t-1) + (1-\alpha) \cdot f(RSSI, HandoffDelay, \ldots ), & APi \text{ is the new } AP \\ \alpha \cdot weight_i(t-1), & APi \text{ isn't the new } AP \end{cases} \quad (1)$$

In Formula 1, t is an index of handoff. A value of $\alpha$ is greater than 0 and smaller than 1. f is a function of the handoff status information. The RSSI is an RSSI of the target AP. The weight calculated through Formula 1 may not only reflect each handoff status information, but also may lead to that handoff taking a shorter time has a larger influence on the weight, and handoff taking a longer time has a smaller influence on the weight.

In Step 205, the source AP saves the weight calculated in Step 204.

In this embodiment, the source AP may, for example, maintain an AP information list including a part or all of potential target APs. The AP information list includes an index of an AP, an ID of an AP, a weight of an AP, and a channel of an AP. Furthermore, the AP information list may further record other information. Through saving a channel of an AP, the MH may be directly handed off to the channel of the AP when being associated with the AP, thus reducing the required time.

The weight of each potential target AP may be saved only, and a great amount of historic handoff status information of each potential target AP is no longer saved, thus saving a storage space.

In Step 206, the source AP sends the handoff policy to an MH associated with the source AP.

In this embodiment, the source AP may, for example, send the ID or index of each AP in the AP information list to the MH associated with the source AP according to a weight sequence. Alternatively, the source AP may further send the ID and weight of the AP in the AP information list together to the MH. Therefore, when needing to be handed off, the MH may preferentially select a preferred AP for association according to a sequence of APs or according to a weight of each AP, thus saving the time consumed in the scanning phase in the prior art.

In order to reduce the information amount sent to the MH by the source AP and reduce a storage burden of the MH, the source AP may further send a recommended AP list to an MH associated with the source AP directly. The list includes target APs that the MH may preferentially select when being handed off. For example, the recommended AP list includes IDs of two or three APs. The two or three APs are APs most suitably serving as the target AP selected by the source AP according to the weight of each potential target AP. When being handed off, the MH may preferentially select the two or three APs for association. Furthermore, in order to reduce the scanning time of the MH, the recommended AP list may further include a channel of an AP. Thus, the MH may further reduce the scanning time.

In this embodiment, Step 206 may be, for example, performed when the source AP updates the AP information list each time, may also be performed when the MH is associated with the source AP, and may be performed periodically. In this embodiment, the trigger condition of performing Step 206 is not limited.

In this embodiment, the handoff status information is collected by an MH and an target AP, and is sent to the source AP, so the source AP may determine or update the handoff policy according to the handoff status information, that is, the source AP may calculate weights of different potential target APs and inform an MH associated with the source AP according to the handoff status information, so the MH may select a preferred target AP for association according to corresponding information, thus avoiding time wasted in the scanning phase.

Furthermore, in this embodiment, the target AP may also calculate the weight according to the handoff status information, and send the calculation result to the source AP.

Furthermore, in this embodiment, during weight calculation, the load situation of the target AP may be further added. For example, the higher the load of the target AP is, the lower the weight is.

Figure 3:
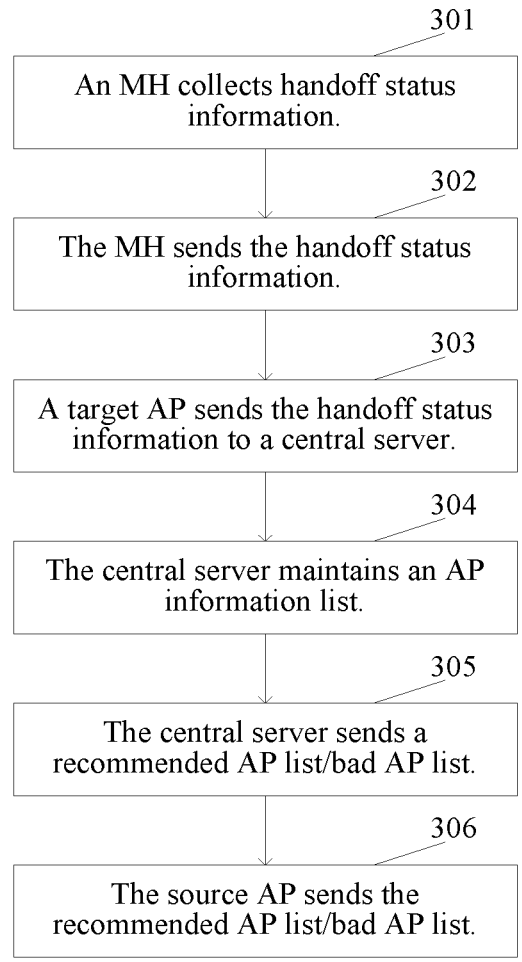
FIG. 3 is a schematic flow chart of yet another handoff control method according to an embodiment of the present invention.

A yet another handoff control method according to an embodiment of the present invention is described in detail below with reference to FIG. 3. The method includes the following steps.

In Step 301, an MH collects handoff status information.

In Step 302, the MH sends the collected handoff status information to a target AP.

In Step 303, the target AP sends the handoff status information to a central server.

In this embodiment, the handoff status information sent by the target AP may include, for example, the handoff status information collected by the MH, and may further include handoff status information collected by the target AP.

In Step 304, the central server maintains an AP information list according to the handoff status information.

The AP information list maintained by the central server may include, for example, handoff status information of each potential target AP. Alternatively, in order to reduce a storage space, the central server may calculate a weight of each potential target AP, and maintain an AP information list including the weights.

In this embodiment, the central server may also not process the handoff status information, but sends the handoff status information to the source AP, so the source AP processes the handoff status information. The central server processes the handoff information, so as to make the implementation of the AP less complicated and reduce the cost of the AP. That is to say, the AP does not need to have the function of processing the handoff status information, and the central server processes the handoff status information.

In Step 305, the central server sends a handoff policy to the source AP, in which the handoff policy includes a recommended AP list and/or a bad AP list.

In this embodiment, in order to save the storage space of the AP, the central server may maintain an AP information list, and only send a recommended AP list and/or a bad AP list to the source AP.

In this embodiment, Step 305 may be performed every time the AP information list is updated or established, may also be periodically performed, or may be performed in other trigger conditions.

In Step 306, the source AP sends the recommended AP list and/or bad AP list to the MH.

In this embodiment, the trigger condition of performing Step 306 is not limited. Further, according to the demands, the source AP may send the recommended AP list and the bad AP list to the MH at the same time or respectively, or the source AP may send the recommended AP list only or send the bad AP list only.

Through the handoff control method provided in this embodiment, the central server may process the handoff status information collected by at least one of the MH, the source AP, and the target AP. The central server may also generate the corresponding handoff policy, so the MH may save the time in the scanning phase during the handoff.

Figure 4:
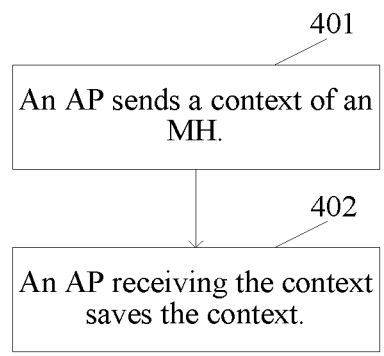
FIG. 4 is a schematic flow chart of a further handoff control method according to an embodiment of the present invention.

A further handoff control method according to an embodiment of the present invention is described in detail below with reference to FIG. 4. The method includes the following steps.

In Step 401, an AP sends a context of an MH to a part or all of potential target APs of the AP.

In this embodiment, preferentially, the AP sends the context of the MH to each AP in a recommended AP list of the AP. The context of the MH is not limited in this embodiment, which may, for example, include at least one of: a session of the MH, quality of service (QoS), and safety association information.

In Step 402, the AP receiving the context saves the context of the MH.

Through Step 402, a potential target AP may acquire the context of the MH. If subsequently the MH is associated with the potential target AP, the communication may be performed directly without transmitting the corresponding context, so as to further save the time required for the handoff of the MH and reduce a total time delay of the handoff. Further, by providing the context of the MH to the potential target AP, continuity of services is also ensured, and a situation of packet loss in the handoff procedure is avoided.

The method provided in this embodiment may be combined with other methods provided by above embodiments, such as the embodiments in FIGS. 1, 2, 3, and 5.

When a central server is disposed, in Step 401, the AP may, for example, send the context of the MH to the central server and the central server forwards the context to the potential target AP of the AP.

In this embodiment, the AP receiving the context saves the context, and may further delete the context in a certain condition. For example, when the MH is already associated with the AP or the MH is not associated with the AP within a certain time, the AP may delete the saved context to save a storage space.

Figure 5:
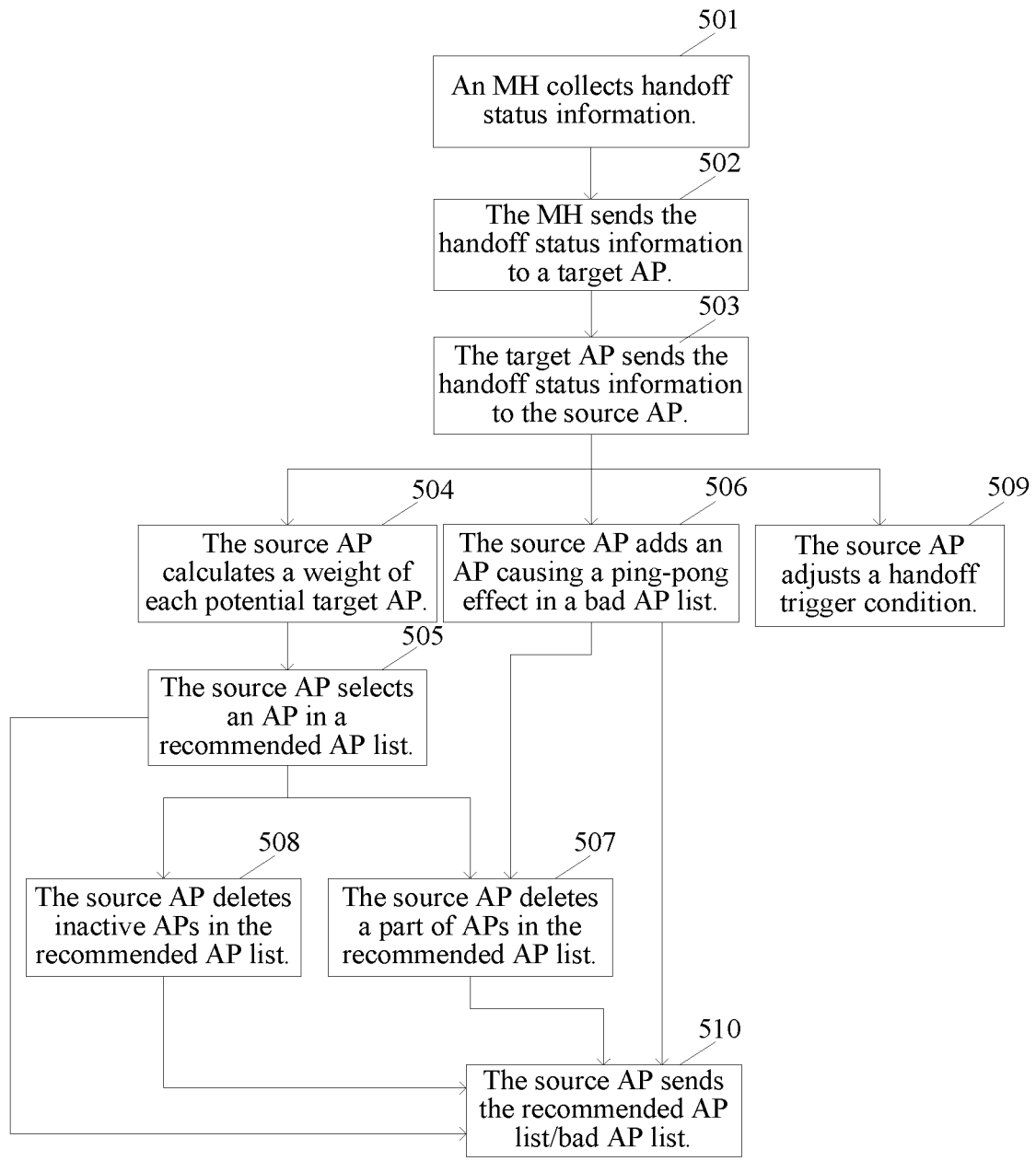
FIG. 5 is a schematic flow chart of yet a further handoff control method according to an embodiment of the present invention.

Yet a further method for collecting information during handoff according to an embodiment of the present invention is described in detail below with reference to FIG. 5. The method includes the following steps.

In Step 501, an MH collects handoff status information.

In Step 502, the MH sends the collected handoff status information to a target AP.

In Step 503, the target AP sends the handoff status information to a source AP.

In this embodiment, the target AP may directly send the handoff status information to the source AP through the IAPP. The target AP may also send the handoff status information to the central server, and the central server then sends the handoff status information to the source AP.

In Step 503, the handoff status information sent by the target AP may include the handoff status information collected by the MH, and may further include the handoff status information collected by the target AP.

In Step 504, the source AP calculates a weight of each potential target AP according to the handoff status information.

In this embodiment, the handoff status information includes, for example, an RS SI of the target AP, a total handoff time delay, and a load situation of the target AP. The weight of each potential target AP is, for example, proportional to the RSSI of the target AP, inversely proportional to the total handoff time delay, and inversely proportional to the load of the target AP.

In Step 505, the source AP selects three APs having the highest weights as APs in a recommended AP list according to the weights of the potential target APs.

In Step 506, the source AP judges whether the potential target APs include an AP which might cause a ping-pong effect between the AP and the source AP. If yes, the AP is added in a bad AP list. Furthermore, if the AP is an AP in the recommended AP list, the AP is deleted from the recommended AP list.

In Step 506, there are many ways for the source AP to judge whether the potential target APs include the AP which might cause the ping-pong effect. For example any one of following way may used for judging ping-pong effect: 1) the MH is handed off between the source AP and a certain target AP for several times, 2) the source AP is included in the recommended AP list of the target AP, and 3) a time that the MH is associated with the source AP or the target AP is too short.

In this embodiment, Steps 506 and 504 are not subject to a definite execution order.

In Step 507, the source AP judges whether the recommended AP list and the bad AP list have the same AP. If yes, the AP is deleted from the recommended AP list.

In specific scenario, the bad AP list may not be maintained. When finding a corresponding AP through Step 506, the source AP judges whether the recommended AP list includes the AP. If yes, the AP is deleted from the recommended AP list.

In this embodiment, Step 507 may not be included. That is to say, when a certain AP is added in the bad AP list, it is examined whether the AP is included in the recommended AP list. If yes, the AP is deleted from the recommended AP list.

In Step 508, the source AP judges whether the potential target APs include a degraded AP. If yes, the AP is added in the bad AP list.

For ease of illustration, APs having a weight reduction greater than or equal to a threshold value and/or APs having a sequence decrease greater than or equal to a threshold value are referred to as degraded APs.

When the calculated weight is related to a time that the handoff occurs, if a certain AP has no MH to for association for a long time, the weight of the AP is continuously reduced, or perhaps a sequence is continuously decreased. At this time, it may be initially judged that a certain failure occurs to the AP, such as that the AP no longer works or the RSSI of the AP is decreased rapidly. Through Step 508, the self-diagnosis of failures may be achieved.

In Step 509, the source AP adjusts the handoff trigger condition.

In Step 509, the source AP may, for example, adjust a threshold value of triggering handoff or other conditions according to the handoff status information. For example, the source AP knows that the signal strength of the source AP is rapidly decreased within a certain area according to the handoff status information. In this situation, if the MH uses the originally set RSSI as the handoff trigger condition, the signal strength of the source AP cannot support subsequent communication with the MH when the handoff is not yet completed, thereby causing disruption of services. Therefore, the source AP may increase the RSSI of the source AP that triggers handoff, so the MH may complete the handoff procedure before the signal strength of the source AP is rapidly decreased to become unable to support the communication with the MH.

Furthermore, in this embodiment, the handoff trigger condition may also not be adjusted, but a handoff prompt is set. That is to say, the MH is prompted that the fast handoff policy needs to be adopted or other methods need to be adopted to complete the handoff procedure before the signal strength is decreased to become unable to support the communication.

In this embodiment, Step 509 is independent from other steps of generating or updating the handoff policy, that is, no specific execution sequence exists.

In Step 510, the source AP sends the recommended AP list and/or bad AP list to the MH.

In this embodiment, steps of generating or updating the handoff policy are not subject to a specific execution sequence.

In each embodiment of the present invention, the AP in the bad AP list may also be selected as the target AP. For example, when it is scanned that all APs capable of being associated are in the bad AP list, the AP in the bad AP list may be used as the target AP for association.

Furthermore, in this embodiment, both the processing of the handoff status information and maintenance of the recommended AP list and bad AP list by the source AP may be completed by the central server. Alternatively, the processing of the handoff status information and the maintenance of the recommended AP list and bad AP list may be completed by the central server and source AP respectively. If both the processing of the handoff status and the maintenance of the recommended AP list and bad AP list are completed by the central server, the implementation of the AP may become simpler and cheaper. Further, as the central server may collect and record more information, the generation of a better handoff policy is beneficial. Further, when the central server only sends the recommended AP list and/or bad AP list to the source AP, signaling overhead in the handoff may be reduced.

Through the handoff control method provided in this embodiment, the source AP may generate or update various handoff policies according to the handoff status information, so as to optimize an existing handoff process, save a handoff time, and reduce a handoff time delay. In this embodiment, while the existing handoff process is optimized, a basic structure of an existing network is not changed, and the protocols are not changed, so the existing network is hardly changed during implementation of the existing network and the cost is low. As the handoff policy is generated, the MH may be handed off according to the handoff policy, thus greatly reducing a scanning time. If the AP sends a context of the MH to an AP in the recommended AP list, the time for authentication and association may be further greatly reduced, service continuity is increased, and packet loss possibility is reduced. Furthermore, in consideration of a load situation of the target AP and/or a situation that an AP in the recommended AP list is not associated for a long time, the method provided in this embodiment may facilitate implementation of load balance for the network, increase possibility of a successful handoff through automatic diagnosis of failure APs, and save a handoff time.

In this embodiment, multiple handoff policies are exemplarily provided. In practical implementation, more handoff policies may be further designed according to practical demands and handoff status information required by the handoff policies are correspondingly collected.

Figure 6:
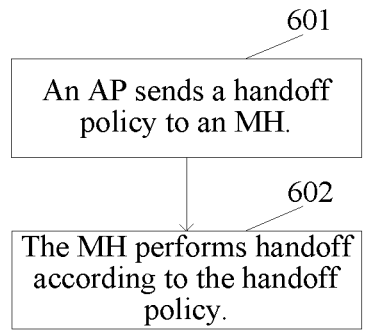
FIG. 6 is a schematic flow chart of a handoff method according to an embodiment of the present invention.

A handoff method according to an embodiment of the present invention is described in detail below with reference to FIG. 6. In the handoff method, the handoff may be performed by using handoff policies provided in embodiments with reference to FIGS. 1 to 5, so as to optimize handoff of the MH and reduce a handoff time delay. The method includes the following steps.

In Step 601, an AP sends the handoff policy to an MH associated with the AP.

In this embodiment, Step 601 may be performed when the MH is associated with the AP, may also be periodically performed, or may be performed when the MH decides handoff, or may further be performed in other trigger conditions.

In Step 602, the MH is handed off according to the handoff policy.

Figure 7A:
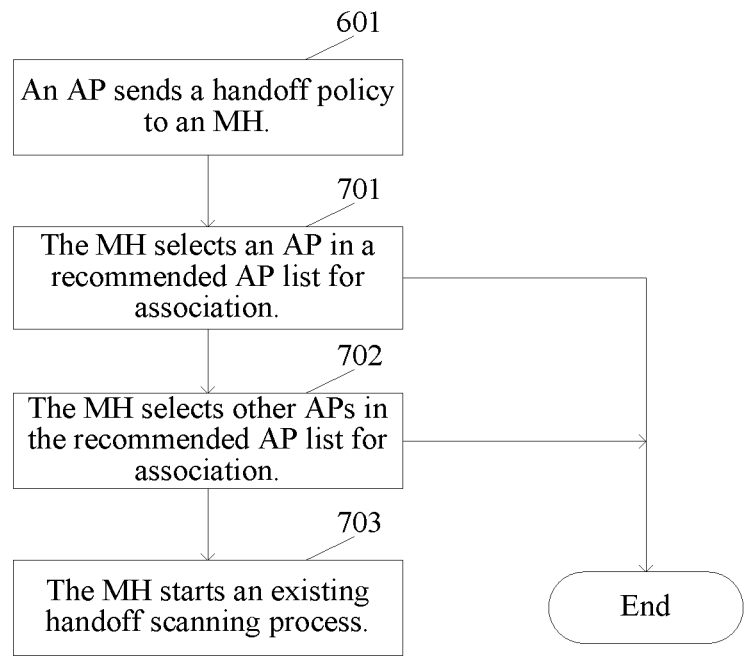
FIG. 7a is a schematic flow chart of a handoff method according to an embodiment of the present invention.

As shown in FIG. 7a, if the handoff policy in Step 601 includes a recommended AP list, Step 602 may specifically include the following steps.

In Step 701, when the handoff trigger condition is satisfied, the MH selects an AP in the recommended AP list for association.

In Step 701, when selecting one from the recommended AP list for association, the MH may, for example, select one randomly or according to a weight sequence.

In this embodiment, when one AP is selected to be associated, the existing protocols are still adopted for the communication with the AP, and the description is omitted.

After Step 701 is performed, if the MH is successfully associated with the selected AP, the process is end.

In Step 702, if the MH cannot be successfully associated with the selected AP, the MH selects other APs from the recommended AP list for association.

After Step 702 is performed, if the MH can be successfully associated with one AP in the recommended AP list, the process is end.

In Step 703, if the MH cannot be successfully associated with any AP in the recommended AP list, the existing handoff scanning process is started.

In this embodiment, the MH preferentially selects an AP in the recommended AP list for association, so overall scanning is not needed, thus saving a great amount of scanning time, and facilitating realization of fast handoff. Also, the AP in the recommended AP list is usually an AP having a shorter handoff total time delay and higher signal strength, so that the MH can be rapidly handed off to the most preferred APs.

Figure 7B:
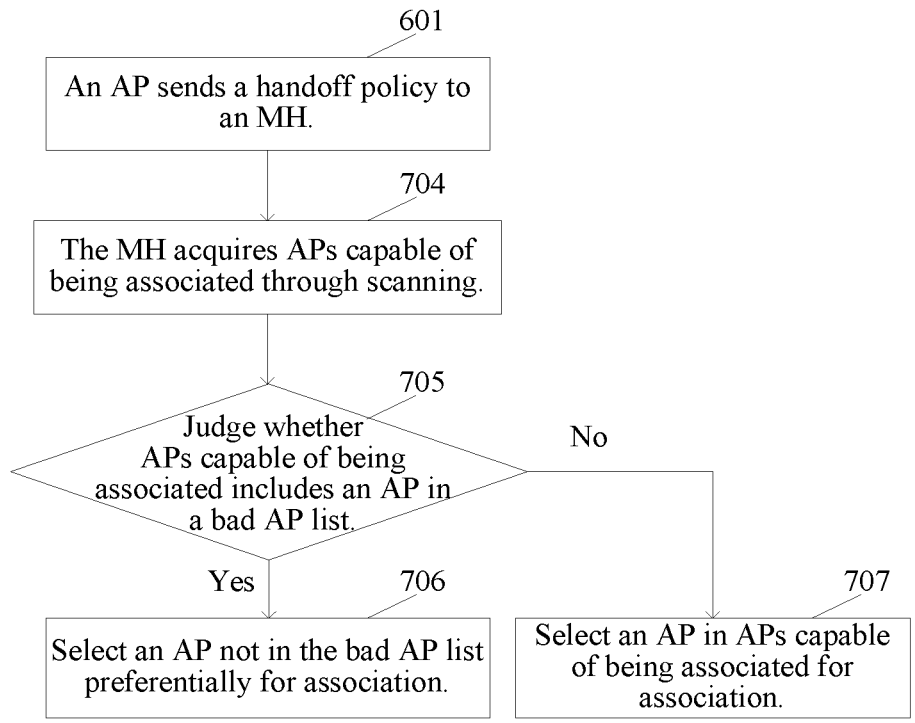
FIG. 7b is a schematic flow chart of a handoff method according to an embodiment of the present invention.

As shown in FIG. 7b, if the handoff policy in Step 601 includes a bad AP list, Step 602 may specifically include the following steps.

In Step 704, the MH acquires at least one AP capable of being associated through scanning.

In this embodiment, the MH scanning may be, for example, a scanning process in the prior art, or may be Step 703, that is, the scanning process started when no AP in the recommended AP list can be successfully associated.

In Step 705, the MH judges whether APs capable of being associated include an AP in a bad AP list. If yes, Step 706 is performed. If not, Step 707 is performed.

In Step 706, if all APs capable of being associated are included in the bad AP list, one of the APs capable of being associated is selected to be associated. If the APs capable of being associated have a part of APs that are not included in the bad AP list, the MH preferentially selects an AP not in the bad AP list from APs capable of being associated for association.

In Step 707, one of the APs capable of being associated is selected to be associated.

Specifically, existing handoff processes and protocols may be adopted in Step 706 and 707, and the description is omitted here.

In this embodiment, as the source AP provides a bad AP list for the MH, after performing scanning, the MH may avoid to be associated with the AP in the bad AP list, thus reducing time wasted in unsuccessful association. Further, when only APs in the bad AP list can be associated, the MH may also be associated with the APs.

Furthermore, in this embodiment, during scanning in Step 704, it may be selected not to wait for a response of an AP in the bad AP list, or not to send a probe request to an AP in the recommended AP list.

Furthermore, in this embodiment, if the handoff policy includes a recommended AP list and a bad AP list, the above steps may be combined.

The above embodiments may be referred to each other, and each step in the method disclosed in each embodiment may be implemented by software, hardware, or a combination of software and hardware.

Figure 8:
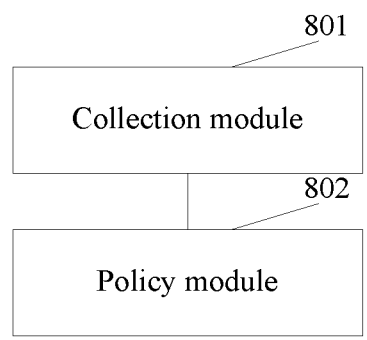
FIG. 8 is a schematic structural view of a handoff control device according to an embodiment of the present invention.

A handoff control device according to an embodiment of the present invention is described in detail below with reference to FIG. 8. The device may be, for example, disposed in an AP, or disposed in an MH, or further disposed in a central server. The device includes a collection module 801, a policy module 802, and a sending module 803.

The collection module 801 is adapted to collect handoff status information of a first MH.

In this embodiment, the collection of the handoff status information may include collection according to its own data, and may also include receiving of handoff status information sent by other equipment. The handoff status information is described in above method embodiments.

If the device provided in this embodiment disposed in a central server, the collection module 801 is specifically used for collecting handoff status information sent by a target AP. If the device is disposed in a source AP, the collection module 801 is specifically used for collecting handoff status information sent by the target AP or the central server. If the device is disposed in the target AP, the collection module 801 is specifically used for collecting the handoff status information sent by the MH.

The policy module 802 generates a handoff policy according to the handoff status information collected by the collection module 801.

In this embodiment, the handoff policy is described in above method embodiments.

The sending module 803 is adapted to send the handoff policy generated by the policy module 802 to an MH associated with the source AP.

Through the device provided in this embodiment, a handoff policy may be generated according to the handoff status information, so the MH may be handed off according to the handoff policy. Performance such as a handoff time, a handoff success possibility, and service continuity may be optimized.

The device provided in this embodiment may be, for example, adapted to implement the method embodiment as shown in FIG. 1.

Figure 9:
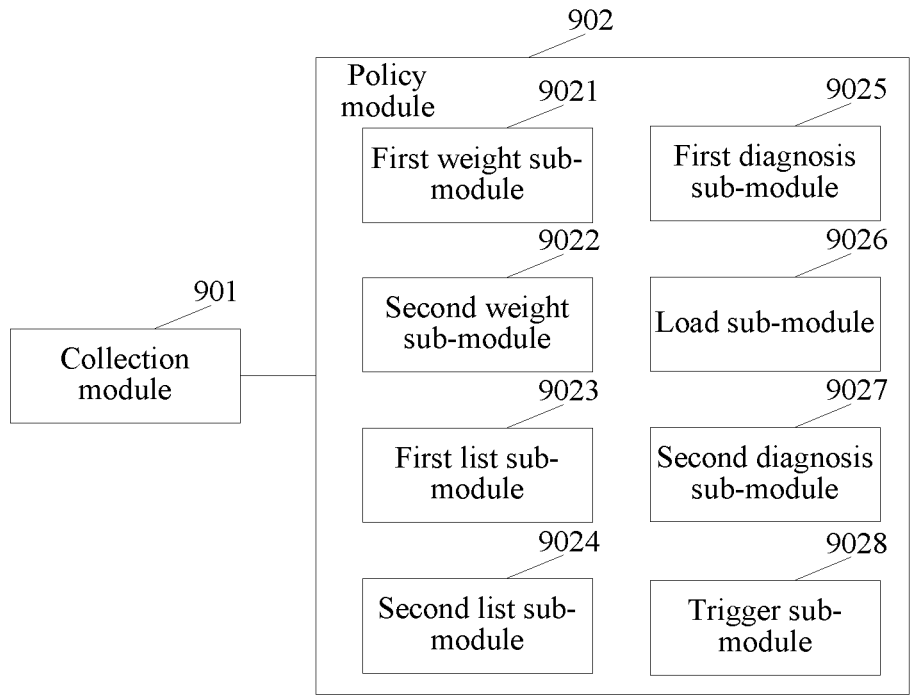
FIG. 9 is a schematic structural view of another handoff control device according to an embodiment of the present invention.

Another handoff control device according to an embodiment of the present invention is described in detail below with reference to FIG. 9. The device includes a collection module 901, a policy module 902, and a sending module 903.

The collection module 901 is adapted to collect handoff status information of a first The policy module 902 is adapted to generate a handoff policy according to the handoff status information collected by the collection module 901.

The sending module 903 is adapted to send the handoff policy generated by the policy module 902 to an MH associated with a source AP.

In this embodiment, the policy module 902, for example, includes a first weight sub-module 9021, a second weight sub-module 9022, a first list sub-module 9023, a second list sub-module 9024, a first diagnosis sub-module 9025, a load sub-module 9026, a second diagnosis sub-module 9027, a trigger sub-module 9028, and a third list sub-module 9029.

The first weight sub-module 9021 is adapted to calculate a weight of a target AP according to the handoff status information collected by the collection module 901. At this time, the handoff status information may include, for example, at least one of: an RSSI of the target AP, a load situation of the target AP, and a total handoff time delay. The specific calculation method is described in above method embodiments.

The second weight sub-module 9022 is adapted to calculate weights of other potential APs.

Every time when the handoff status information is collected, only the weights of the target APs corresponding to the handoff status information may be calculated. Alternatively, the weights of all potential target APs may be calculated.

In this embodiment, during calculation of the first weight sub-module 9021 and the second weight sub-module 9022, the influence of the time that the handoff occurs may be specifically further considered. For example, if the handoff takes a longer time, the influence of the weight is smaller, while if the handoff takes a shorter time, the influence of the weight is larger. The specific calculation method may be referred to the embodiment as shown in FIG. 2.

The first list sub-module 9023 is adapted to select at least one AP from the potential target APs according to the weights acquired by the first weight sub-module 9021 and/or the second weight sub-module 9022, and adding the selected AP in a recommended AP list.

The second list sub-module 9024 is adapted to select at least one AP from the potential target APs according to the weights acquired by the first weight sub-module 9021 and/or the second weight sub-module 9022, and adding the selected AP in the bad AP list.

The first diagnosis sub-module 9025 is adapted to judge whether the potential target APs include a degraded AP, and if yes, to add the degraded AP in the bad AP list.

The load sub-module 9026 is adapted to add the target AP in the bad AP list and/or delete the target AP from the recommended AP list when the load of the target AP is too high according to the handoff status information collected by the collection module 901.

The second diagnosis sub-module 9027 is adapted to judge whether a ping-pong effect can occur between the target AP and the source AP according to the handoff status information collected by the collection module 901, and if yes, to add the target AP in the bad AP list. In this embodiment, the judgment of the ping-pong effect is described in above method embodiments.

The trigger sub-module 9028 is adapted to adjust a handoff trigger condition for an MH associated with the source AP and/or adapted to set a handoff prompt for an MH associated with the source AP according to the handoff status information collected by the collection module 901.

The third list sub-module 9029 is adapted to select a part or all of APs from the potential target APs of the source AP, and to add the selected AP in the recommended AP list. The third list sub-module 9029 may, for example, select the preferred AP according to the handoff status information of each potential target AP, and add the selected AP in the recommended AP list.

In this embodiment, the device may further include an acquisition module, which is adapted to acquire a context of an MH associated with the source AP. Correspondingly, the sending module 903 is further adapted to send the context to the potential target APs, and more particularly, the APs in the recommended AP list.

In this embodiment, the device may further include a save module, which is adapted to save the recommended AP list and/or bad AP list. Alternatively, the device may not have the save module, and the recommended AP list and/or bad AP list is sent to the MH and/or source AP through the sending module 903.

The device provided in this embodiment may collect the handoff status information and generate the corresponding handoff policy according to practical demands, so the handoff process can be optimized according to the handoff policy, thus fast and good handoff is realized.

The device provided in this embodiment may be, for example, adapted to implement the above method embodiments.

Figure 10:
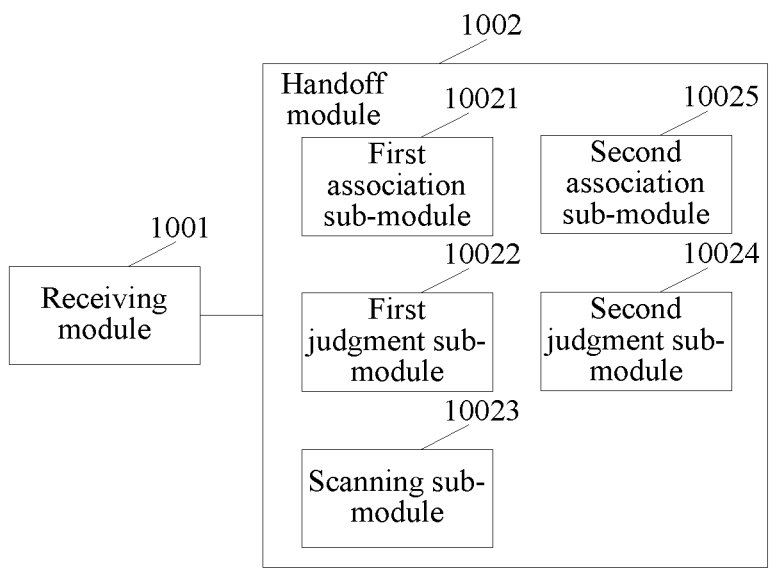
FIG. 10 is a schematic structural view of an MH according to an embodiment of the present invention.

An MH according to an embodiment of the present invention is described in detail below with reference to FIG. 10. The MH includes a receiving module 1001 and a handoff module 1002.

The receiving module 1001 is adapted to receive a handoff policy sent by an AP associated with the MH.

The handoff module 1002 is adapted to perform handoff according to the handoff policy received by the receiving module 1001.

In this embodiment, the handoff policy is described in above method embodiments.

Furthermore, in this embodiment, the handoff module 1002 may include, for example, a first association sub-module 10021 and a first judgment sub-module 10022.

The first association sub-module 10021 is adapted to select an AP from the recommended AP list received by the receiving module 1001 for association. In particular, the first association sub-module 10021 can select an unselected AP in the recommended AP list for association. The first association sub-module 10021 may select the AP randomly or according to weight.

The first judgment sub-module 10022 is adapted to judge whether the recommended AP list includes an unselected AP when the first association sub-module 10021 does not perform association successfully, and if yes, to control the first association sub-module 11021 to perform operations.

In this embodiment, the handoff module 1002 may include a scanning sub-module 10023, a second judgment sub-module 10024, and a second association sub-module 10025.

The scanning sub-module 10023 is adapted to scan APs capable of being associated. The second judgment sub-module 10024 is adapted to judge whether the APs capable of being associated acquired by the scanning sub-module 10023 include APs in a bad AP list, and if yes, to control the second association sub-module 10025 to perform operations. The second association sub-module 10025 is adapted to select an AP not in the bad AP list from the APs capable of being associated for association. In this embodiment, the receiving module 1001 is adapted to receive the bad AP list.

In this embodiment, the handoff module 1002 may further include the first association sub-module 10021, the first judgment sub-module 10022, the scanning sub-module 10023, the second judgment sub-module 10024, and the second association sub-module 10025. The first judgment sub-module 10022 is further adapted to control the scanning sub-module 10023 to perform operations when no unselected AP exists in the recommended AP list.

The MH provided in this embodiment may further, for example, be handed off according to the handoff trigger condition and/or a handoff prompt received by the receiving module 1001.

The MH provided in this embodiment may be handed off according to the handoff policy sent by the AP associated with the MH, for example, in particular select an AP in the recommended AP list for association to save a scanning time, or avoid selecting an AP in the bad AP list to reduce invalid association attempts.

The MH provided in this embodiment can, for example, implement the above method embodiments.

Figure 11:
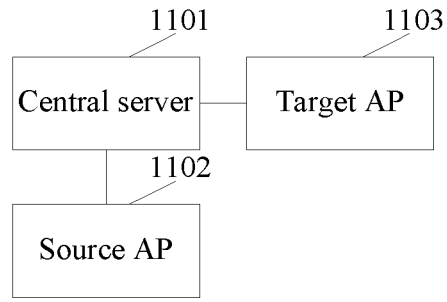
FIG. 11 is a schematic structural view of a handoff control system according to an embodiment of the present invention.

A handoff control system according to an embodiment of the present invention is described in detail below with reference to FIG. 11. The system includes a central server 1101 and a source AP 1102. The central server 1101, for example, includes the devices provided in above device embodiments.

In this embodiment, the central server 1101 may be, for example, adapted to collect or receive the handoff status information sent by the AP, and to generate a handoff policy according to the handoff status information. After the handoff policy is generated, the central server 1101 may send the handoff policy to the source AP 1102, or may send a part of information in the handoff policy to the source AP 1102.

In this embodiment, the handoff system may further include, for example, a target AP 1103 adapted to collect the handoff status information or adapted to assist the central server 1101 to realize a part of the function of generating the handoff policy.

The handoff system provided in this embodiment may, for example, enable the MH to reduce handoff time and increase service continuity.

Furthermore, in this embodiment, the central server 1101 may be, for example, adapted to collect the handoff status information, and to send the handoff status information to the source AP 1102. The source AP 1102 is adapted to generate the handoff policy according to the handoff status information. The source AP 1102 includes, for example, the devices provided in above device embodiments.

Figure 12:
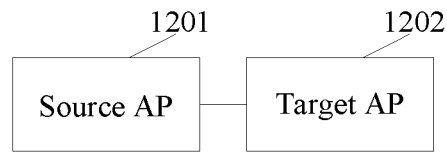
FIG. 12 is a schematic structural view of another handoff control system according to an embodiment of the present invention.

Another handoff control system according to an embodiment of the present invention is described in detail below with reference to FIG. 12. The handoff system includes a source AP 1201 and a target AP 1202. The source AP 1201 is, for example, adapted to collect the handoff status information and to generate the handoff policy, and the target AP 1202 is, for example, adapted to collect the handoff status information and to provide the handoff status information to the source AP 1201. In this embodiment, the source AP 1201 includes, for example, the devices provided in above device embodiments.

Alternatively, in this embodiment, the target AP 1202 is adapted to collect the handoff status information and to generate the handoff policy. The source AP 1201 is adapted to collect the handoff status information or to receive the handoff policy. The target AP 1202 includes, for example, the device provided in above device embodiments.

Through the system provided in this embodiment, the MH may perform handoff according to the acquired handoff policy, so as to optimize the handoff process, reduce a handoff total time delay, increase service continuity, and increase possibility of successful handoff.

Persons skilled in the art should understand that various modifications and changes can be made to each embodiment of the present invention without departing from the essence of the present invention. The modifications and changes fall within the protection scope of the present invention. Thus, the protection scope of the present invention is defined by the appended claims.

The invention claimed is:

1. A handoff control method, which comprises:
collecting handoff status information of a first mobile host (MH), the handoff status information including at least one parameter representing at least one status occurring when the first MH performs handoff from a source access point (AP) to a target AP, and wherein the first MH includes at least one MH;
generating a handoff policy according to the handoff status information, the handoff policy being used for optimizing a handoff process of an MH associated with the source AP, and the handoff process occurs after the first MH is handed off from the source AP, thereby judging whether a ping-pong effect may occur between the target AP and the source AP according to the handoff status information, and, if a potential for the ping-pong effect is confirmed, adding the target AP in a bad AP list; and
sending the handoff policy to an MH associated with the source AP in order to cause the MH associated with the source AP perform a handoff according to the handoff policy, and thereby sending the bad AP list to the MH associated with the source AP in order to avoid the MH associated with the source AP selecting an AP in the bad AP list for association, or to make the MH associated with the source AP select an AP in the bad AP list for association last.

2. The method according to claim 1, wherein a path which the MH associated with the source AP moving along is predictable.

3. The method according to claim 1, wherein the step of collecting the handoff status information of the first MH comprises any one of:
receiving, by a central server, the handoff status information sent by the target AP;
receiving, by the source AP, the handoff status information sent by the target AP or a central server; and
receiving, by the target AP, the handoff status information sent by the first MH.

4. The method according to claim 1, wherein the handoff status information comprises at least one of: a received signal strength indicator (RSSI) of the source AP when the first MH is handed off, an RSSI of the target AP when the first MH is handed off, a total handoff time delay when the first MH is handed off from the source AP to the target AP, an association time between the first MH and the source AP, and a load situation of the target AP.

5. The method according to claim 4, wherein the handoff status information comprises at least one of: the RSSI of the target AP when the first MH is handed off, the total handoff time delay when the first MH is handed off from the source AP to the target AP, and the load situation of the target AP, and
the step of generating the handoff policy according to the handoff status information comprises: calculating a weight of the target AP according to the handoff status information; and
the step of sending the handoff policy to the MH associated with the source AP comprises: sending the weight of the target AP to the MH associated with the source AP in order to make the MH associated with the source AP select a target AP for handoff according to the weight; or sending ID or index of the target AP, in sequence according to the weight, to the MH associated with the source AP in order to make the MH associated with the source AP select a target AP for handoff according to the sequence.

6. The method according to claim 5, wherein
the step of generating the handoff policy according to the handoff status information further comprises: calculating a weight of potential target AP other than the target AP, wherein the potential target AP can serve as a target AP for the MH associated with the source AP; and
the step of sending the handoff policy to the MH associated with the source AP further comprises: sending the weight of the potential target AP to the MH associated with the source AP, or sending ID or index of the potential target AP, in sequence according to the weight, to the MH associated with the AP.

7. The method according to claim 5, wherein
the step of generating the handoff policy according to the handoff status information further comprises: selecting at least one AP from the potential target APs according to the weights, and adding the selected AP in a recommended AP list; and
the step of sending the handoff policy to the MH associated with the source AP comprises: sending the recommended AP list to the MH associated with the source AP in order to make the MH associated with the source AP first select an AP in the recommended AP list as the target AP for handoff.

8. The method according to claim 1, wherein:
the step of generating the handoff policy according to the handoff status information comprises: selecting a part or all of APs from potential target APs of the source AP according to the handoff status information, and adding the selected AP in a recommended AP list, wherein the potential target APs are capable of serving as target APs for the MH associated with the source AP; and
the step of sending the handoff policy to the MH associated with the source AP comprises: sending the recommended AP list to the MH associated with the source AP in order to make the MH associated with the source AP first select an AP in the recommended AP list as a target AP for handoff.

9. The method according to claim 8, which further comprises:
acquiring a context of the MH associated with the source AP; and
sending the context to an AP in a recommended AP list.

10. A handoff control method, which comprises:
collecting handoff status information of a first mobile host (MH), the handoff status information including at least one of: a received signal strength indicator (RSSI) of a source access point (AP) when the first MH is handed off, an RSSI of the target AP when the first MH is handed off, a total handoff time delay when the first MH is handed off from the source AP to the target AP, an association time between the first MH and the source AP, or a load situation of the target AP;
generating a handoff policy according to the handoff status information by calculating a weight of the target AP according to the handoff status information, the handoff policy being used for optimizing a handoff process of an MH associated with the source AP, and the handoff process occurs after the first MH is handed off from the source AP; and
sending the handoff policy to an MH associated with the source AP in order to cause the MH associated with the source AP perform a handoff according to the handoff policy, and thereby sending the weight of the target AP to the MH associated with the source AP in order to make the MH associated with the source AP select a target AP for handoff according to the weight; or sending ID or index of the target AP, in sequence according to the weight, to the MH associated with the source AP in order to make the MH associated with the source AP select a target AP for handoff according to the sequence; and
considering an influence of a handoff time of the first MH in a calculation of the weights, wherein handoffs taking a longer time have a smaller influence on the weight, and handoffs taking a shorter time have a greater influence on the weight.

11. The method according to claim 10, which further comprises:
judging whether potential target APs comprise a degraded AP; and
if yes, adding the degraded AP in a bad AP list in order to avoid the MH associated with the source AP selecting an AP in the bad AP list for association, or to make the MH associated with the source AP selects an AP in the bad AP list for association last, wherein the degraded AP comprises an AP having a weight reduction greater than or equal to a threshold value, and/or an AP having a sequence decrease greater than or equal to a threshold value.

12. A handoff control method, which comprises:
collecting handoff status information of a first mobile host (MH), the handoff status information including at least one of: a received signal strength indicator (RSSI) of the source access point (AP) when the first MH is handed off, an RSSI of the target AP when the first MH is handed off, a total handoff time delay when the first MH is handed off from the source AP to the target AP, an association time between the first MH and the source AP, or a load situation of the target AP;
generating a handoff policy according to the handoff status information, the handoff policy being used for optimizing a handoff process of an MH associated with the source AP, and the handoff process occurs after the first MH is handed off from the source AP; and
sending the handoff policy to an MH associated with the source AP in order to cause the MH associated with the source AP perform a handoff according to the handoff policy;
wherein, if the handoff status information comprises the load situation of the target AP,
the step of generating the handoff policy according to the handoff status information comprises: adding a target AP in a bad AP list according to the load situation of the target AP, if the load of the target AP is greater than or equal to a threshold value; and
the step of sending the handoff policy to the MH associated with the source AP comprises: sending the bad AP list to the MH associated with the source AP in order to avoid the MH associated with the source AP selecting an AP in the bad AP list for association, or to make the MH associated with the source AP select an AP in the bad AP list for association last.

13. A handoff control method, which comprises:
collecting handoff status information of a first mobile host (MH), the handoff status information including at least one parameter representing at least one status occurring when the first MH performs handoff from a source access point (AP) to a target AP, and wherein the first MH includes at least one MH;
generating a handoff policy according to the handoff status information by adjusting a handoff trigger condition of the MH associated with the source AP according to the handoff status information, and/or setting a handoff prompt for the MH associated with the source AP according to the handoff status information, the handoff policy being used for optimizing a handoff process of an MH associated with the source AP, and the handoff process occurs after the first MH is handed off from the source AP; and sending the handoff policy to an MH associated with the source AP in order to cause the MH associated with the source AP perform a handoff according to the handoff policy, and thereby sending the handoff trigger condition and/or the handoff prompt to the MH associated with the source AP in order to make the MH associated with the source AP perform handoff according to the handoff trigger condition and/or the handoff prompt.

14. A handoff method, comprising:

receiving, by a mobile host (MH), a handoff policy sent by an access point (AP), wherein the MH is associated with the AP and the handoff policy comprises one or more of: a recommended AP list, a bad AP list, a weight of the AP, a handoff trigger condition, or a handoff prompt; and performing, by the MH, handoff according to the handoff policy, wherein, if the handoff policy comprises the recommended AP list, the step of performing handoff according to the handoff policy comprises:

selecting, by the MH, an AP in the recommended AP list for association; and selecting, by the MH, another AP in the recommended AP list, until no unselected AP exists in the recommended AP list or until the MH successfully associates with an AP in the recommended AP list, if the MH fails to associate with the selected AP, wherein, if the handoff policy comprises the bad AP list, the step of performing handoff according to the handoff policy further comprises:

obtaining, by the MH, APs capable of being associated through scanning, if no AP in the recommended AP list is able to be successfully associated with the MH;

judging, by the MH, whether the APs capable of being associated comprise an AP in the bad AP list; and if yes, selecting, by the MH, an AP not in the bad AP list from the APs capable of being associated for association.

15. A handoff method, comprising:

receiving, by a mobile host (MH), a handoff policy sent by an access point (AP), wherein the MH is associated with the AP and the handoff policy comprises one or more of: a recommended AP list, a bad AP list, a weight of the AP, a handoff trigger condition, or a handoff prompt; and performing, by the MH, handoff according to the handoff policy, wherein, if the handoff policy comprises the bad AP list, the step of performing handoff according to the handoff policy comprises:

obtaining, by the MH, APs capable of being associated through scanning;

judging, by the MH, whether the APs capable of being associated comprise an AP in the bad AP list; and if yes, selecting, by the MH, an AP not in the bad AP list from the APs capable of being associated for association.

16. The method according to claim 15, wherein the step of performing handoff according to the handoff policy further comprises:

if no AP that is not in the bad AP list is available for association with the MH, selecting, by the MH, an AP in the bad AP list for association.

\* \* \* \* \*